3,232,909
SOLID STATE POLYMERIZATION OF POLYAMIDE-FORMING REACTANTS UNDER AUTOGENOUS PRESSURE
Allen C. Werner, Chatham, N.J., assignor to Celanese Corporation of America, New York, N.Y., a corporation of Delaware
No Drawing. Filed Dec. 29, 1961, Ser. No. 163,051
18 Claims. (Cl. 260—78)

This invention relates to an improved method of synthesizing high molecular weight polyamides capable of being formed into useful shaped articles such as filaments.

Various methods have been proposed for the formation of polyamides which are capable of being formed into shaped articles such as filaments of desirable properties. For example, in the production of some of the commercial types of polyamides, the procedure used is to first form an aqueous solution of a salt of the polyamide-forming monomers e.g. a diamine and dicarboxylic acid, and then polymerize the mass under conditions specified to maintain the mass as a liquid until a polyamide having the desired properties is formed. However, this method cannot be used in the case of certain polyamides, e.g., many of those melting above 275° C. which tend to seriously degrade and/or polymerize to useless infusible mass when it is attempted to prepare them by completely fusing the corresponding salt. Moreover, an additional operation is often required to obtain the fused polymer mass resulting from these processes in conveniently handled form.

Another type of process for the production of high molecular weight polyamides employs the so-called "interfacial" technique e.g. an aqueous solution of diamine is contacted with an organic solvent solution of an acyl chloride of a dicarboxylic acid. However, this type of process is often economically unattractive due, for example, to the necessity of employing expensive starting reagents.

It is an object of this invention to provide an improved process of making high molecular weight polyamides. It is a further object of this invention to provide a process of making relatively undegraded polyamides of the type which tend to seriously degrade and/or polymerize to a useless infusible mass when prepared in the completely liquid state. It is a further object of the invention to provide a simple and economical process for the synthesis of polyamides from which polymer in conveniently handled form is obtained. It is a still further object of this invention to provide a process of obtaining polyhexamethylene terephthalamide of particularly high molecular weight as indicated by its inherent viscosity. Other objects will be apparent from the following detailed description and claims.

In accordance with one aspect of the invention a finely divided polyamide precursor, e.g. a salt of monomers containing carboxylic and amino groups, is polymerized by heating the precursor up to a polymerization temperature under autogenous pressure and while moving the particles with respect to one another until the initial polymerization reaction has proceded to a substantial degree preferably to about equilibrium as indicated, for example, by a leveling out in the rate of pressure rise when the reactor is closed.

By "autogenous pressure" is meant a pressure at least partially developed by retaining some vapors produced during the heating and polymerization, e.g. product vapors such as water of reaction and, in some cases, vapors of a volatile reactant originally tied up in the precursor, e.g. a diamine such as hexamethylene diamine. While this is preferably accomplished by retaining all of the vapors produced during this period, i.e. carrying out the polymerization in a closed vessel, it may also be achieved by allowing the vapors to escape at a rate lower than that at which they are produced or by allowing the pressure to build up by one of the aforesaid methods and maintaining said pressure constant by allowing the vapors to escape at a rate about equal to that at which they are produced. The pressure at the beginning of the polymerization at autogenous pressure may be close to atmospheric or may be higher than atmospheric, e.g. up to 300 p.s.i.g. due to the presence of vapors, e.g. excess water vapor or an inert gas such as nitrogen or argon, in the reaction zone. It is also possible to initiate the polymerization reaction under autogenous pressure at sub atmospheric pressures, e.g. down to 1 or 2 mm. of mercury, by evacuating the reactor prior to initiation of the polymerization reaction.

The maximum pressure reached during the autogenous pressure step is suitably in the range of 300 to 1000 p.s.i.g. preferably in the range of 500 to 800 p.s.i.g. The period of polymerization under autogenous pressure, e.g. from the start of polymerization as indicated by a sudden rise in the rate of pressure build-up to the point at which the pressure in the reactor is substantially reduced by venting, may vary for example from about ½ hour to about 6 hours or more. In many cases the polymer precursor, e.g. salt, is charged to the reactor at room temperature, the reactor closed, and the precursor heated up to polymerization temperature in the closed reactor, e.g. in a time period within the range of about ¼ to about 2 hours.

The polymerization temperature or temperatures during the autogenous pressure step is generally within the range of from about 20° C. below the melting point of the original precursor up to the melting point of the mass at any point during the polymerization. However, the heat transferred into the mass during polymerization should not at any time be sufficient to completely or substantially liquify the mass, e.g. by melting or dissolution in the water of reaction or any other liquid present. The polymerization under autogenous pressure is considered to have begun at the initial sharp rise in pressure in the polymerization zone. After the reaction has proceeded to a certain extent so that the melting point of the mass is higher than that of the original precursor because of the degree of polymerization which has occurred, the reaction mass may be heated to a temperature above the melting point of the original precursor.

Since the presence of even small amounts of oxygen during the polymerization reaction may increase the difficulty of shaping the polymer, and adversely affect the properties of the final shaped article, it is desirable to exclude this element from the polymerization zone as far as possible. This may be accomplished, for example, by pressurizing the charged reactor with an inert gas such as nitrogen or argon, e.g. to 100–200 p.s.i.g., venting the reactor to atmospheric pressure and repeating this several times both at room temperature and at an elevated temperature which is however below the temperature of polymerization, e.g. at 150 to 200° C.

In a preferred method of carrying out the process, oxygen is excluded from the reactor charged with substantially dry salt as the polymer precursor, i.e. in the absence of a readily observable liquid phase, using a procedure such as that described above. The salt is then heated up to polymerization temperature with constant stirring, at which point the water of reaction surprisingly forms a liquid phase in which the low polymer is dispersed. Thus, using this procedure, the mass in the reactor is either a dried polymer (before polymerization is initiated) or a suspension of solid polymer in water (after polymerization is initiated). Stirring therefore remains comparatively easy and there is efficient heat transfer to the polymerizing solids. The reactor is then vented to a lower pressure, e.g. atmospheric pressure, during which the water of reaction is vaporized and withdrawn leaving a solid mass of substantially dry polymer in the reactor.

As an alternative method of excluding oxygen from the system, and in accordance with another aspect of the invention an amount of water or some other relatively volatile inert liquid is initially added to the reaction zone with the polyamide precursor, e.g. the corresponding salt. The mass is heated under autogenous pressure to a temperature at which a substantial portion of the volatile liquid is vaporized but below the temperature at which substantial polymerization occurs, e.g. in the range of about 20 to 90° C. below the temperature at which polymerization is initiated under autogenous pressure. The maximum pressure reached during this step is, for example, in the range of 50 to 150 p.s.i.g., and at least part of the vaporized excess water or other volatile liquid is subsequently vented from the reaction zone. In venting, the pressure in the reaction zone may be reduced, for example, to a value in the range of the vapor pressure in the reactor at the temperature of venting down to substantial vacuum. Preferably, however, the pressure is reduced to atmospheric on venting. In some instances the retaining of a substantial excess of water in the reaction zone, e.g. 7 to 25% of the weight of the polymer precursor, is advantageous in terms of the properties of the polymer obtained, e.g. high inherent viscosity and greater degree of product uniformity. The vaporized water or other volatile liquid exuding from the reaction zone has a tendency to flush out any oxygen which is present so that the main reaction under autogenous pressure may be subsequently carried out in the substantially complete absence of oxygen. The amount of water or other volatile liquid initially present may vary within a wide range, e.g. 25 to 100% or higher, preferably 25 to 70% based on the weight of the polymer precursor.

While the polyamide precursor initially employed in the process is preferably a salt of the monomeric reactants, e.g. of a diamine and a dicarboxylic acid, it may also be some other polymer precursor, e.g. a low molecular weight amide of a diamine and a dicarboxylic acid. In general, the autogenous pressure step of this invention results in a polymer having an inherent viscosity of at least 0.3 deciliter per gram.

After the reaction under autogenous pressure has been concluded, the polymer may be suitable for forming into useful shaped articles. However, it is desirable in many cases to further polymerize the mass. Thus, in accordance with another aspect of the invention the pressure in the reaction zone is slowly reduced by venting to a substantially lower level, e.g. in the range of from about 100 p.s.i.g. down to the vapor pressure of the reaction mass at the reaction temperature which is generally in the sub-atmospheric range. Preferably, the pressure is reduced to atmospheric. The pressure reduction may be suitably carried out within a period, for example, of 10 to 120 minutes. The temperature of the mass during the pressure reduction is kept at a level sufficient to sustain additional polymerization reaction and up to the melting point of the mass but the heat transferred should not be great enough to completely melt the polymerizing mass or to substantially decompose the polymer. After the pressure reduction is completed the mass is preferably kept at the lower pressure for an additional reaction period, e.g. of at least 30, preferably 120 to 360 minutes. The temperature during the pressure reduction and the polymerization cycle at the lower pressure is below the melting and decomposition points of the polymer at any time and is suitably within the range of 260 to 290° C., preferably within the range of 270 to 280° C. for higher melting polymers.

In accordance with another aspect of the invention, the efficiency of the reaction and the properties and uniformity of the final product may be improved in some instances by carrying out the reaction in the presence of an inert organic suspension medium which is liquid under the conditions of polymerization and in which the polymerizating material is insoluble. The inert organic liquid must thus have a critical temperature above the polymerization temperature in addition to being thermally stable at the highest temperature reached during the reaction and non-reactive toward any of the other components present. Some specific liquids which may be used are, for example, aromatic hydrocarbons, e.g. toluene, the xylenes (individual or mixed), other polymethylbenzenes, ethylbenzene, the polyethylbenzenes, cumene, naphthalene, the methyl naphthalenes (individual or mixed) such as alpha-methyl naphthalene and beta-methyl naphthalene acenaphthene, polymethylnaphthalenes, biphenyl, diphenylmethane, aliphatic or cycloaliphatic hydrocarbon compounds or mixtures such as cosane, heptadecane, tetrahydronaphthalene decahydronaphthalene, relatively high boiling petroleum hydrocarbon fractions such as kerosenes and gas oils, and ethers such as diphenyl ether and ditolyl ether. The inert liquid may be used, for example, in an amount within the range of 50 to 300% based on the weight of the polymer. After the reaction is completed in the presence of an inert liquid medium, the polymer may be filtered from the bulk of the inert liquid and further treated, e.g. by steam stripping, heating with other means to evaporate the liquid, or by solvent extraction, to remove substantially all the residual inert liquid adhering to it.

The reaction is preferably carried out such that the stoichiometric quantities of monomer reactants are substantially maintained. In the case of a polyamide of a dicarboxylic acid and a diamine, the difference between each of the combined monomers present in the final polymer and the stoichiometric amount capable of reacting with the total amount of the other combined monomer present in the polymer is preferably within the range of +1.5 to −1.5 mol percent of such stoichiometric amount. Moreover, when a salt is employed as the polymer precursor, the difference between the total amount of each of the combined monomers in the polymer, and the total amount of the corresponding monomer in the initial salt is preferably within the range of +1.5 to −1.5 mol percent of the latter amount. For example, if hexamethylene diammonium terephthalate salt is polymerized to polyhexamethylene terephthalamide, the amount of combined terephthalic acid in the final polymer is preferably in the range of 0.985 to 1.015 mols per mol of terephthalic acid in the initial salt.

In accordance with another aspect of the invention, it has been found that stoichiometry of the final polymer may be substantially maintained while improving the ability of the polymer to be formed into shaped articles such as filaments of desirable properties, by adding a small amount of a monomeric reactant, e.g. 0.01% to 1% based on the weight of the polymer precursor, to the mass before polymerization. The reactant may be, for example, a dicarboxylic acid or a diamine in the case of formation of polyamides of these two types of compounds. Surprisingly, it has been found that best results are obtained, i.e. in terms of ease of shaping and properties of the resulting shaped article, when an excess amount of less volatile reactant (e.g. terephthalic acid in the case of production of polyhexamethylene terephthalamide from hexamethylene diammonium terephthalate salt) is used. This is so despite the fact that it is generally believed that loss of more volatile reactant may cause a harmful impairment of stoichiometry in the formation of polyamides of a diamine and a dicarboxylic acid from the corresponding salt.

As stated above, the reaction is generally carried out while moving the particles with respect to one another.

The desired movement may be accomplished for example by stirring the particles while they are being kept at the desired temperature. Another method of accomplishing the required movement is to vibrate or rock the reaction vessel during the reaction.

An indication of the ability of a polymer to be formed into a shaped article such as a filament of desirable properties is its "plugging value" which is inversely related to the tendency of a solution of the polymer to plug the pores of a filter. The plugging value may be determined for example by filtering a dilute solution of the polymer through a standard filtering medium at standard conditions of pressure drop and temperature, measuring the volume of filtrate at definite time intervals, plotting $t/V$ as the ordinate against $t$ as the abscissa where $t$ is the time and $V$ the corresponding volume of filtrate, multiplying the reciprocal of the slope of the resulting straight line by the polymer concentration and dividing by the area of the filter. The units may be chosen so that the plugging value is given in grams per square centimeter.

In some instances, a plot of $t/V$ versus $t$ does not yield a continuous straight line. In these cases, the plugging value may be determined by first calculating the filtration rate, S, corresponding to specific values of $t$ and $V$ from the function $S=(t/V_0)/(t/V)_2$ where $(t/V)_0$ is determined for each value of $t$ and $V$ by drawing the best straight line through that point of the curve of $t/V$ versus $t$ and determining where said straight line intercepts $t=0$. Values of the square root of S are then plotted against corresponding values of V. The straight line portion of the resulting S-shaped curve is then extended to the square root of $S_0$ at one end, where $S_0$ is the initial rate, i.e. the value of $(t/V)_0(t/V)^2$ corresponding to $t=0$ where $(t/V)_0$ is determined as described above, and to zero rate at the other end. The corresponding volume interval $V_\infty$ measures the theoretical volume of filtrate at infinite time. This value may then be multiplied by the polymer concentration of the solution in grams per deciliter and divided by the area of the filter in square centimeters to obtain the plugging value.

The process is of greatest value when one of the so-called "difficultly meltable" polyamides is prepared, i.e. polyamides which tend to seriously degrade and/or polymerize to a useless infusible mass on melting, such as polyamides having a melting point above 275° C., since it is very difficult to prepare these polyamides in a useful form from a fused precursor. A particularly important group of polyamides is the poly (polymethylene) terephthalamides wherein the polyamide polymethylene groups contain for example 1 to 10 carbon atoms such as polyhexamethylene terephthalamide, polyethylene terephthalamide, polytetramethylene terephthalamide, polyoctamethylene terephthalimide, and polypiperazylene terephthalamide. Other polyterephthalamides which may be prepared are for example poly-p, -o, and m-xylylene terephthalamides, poly (p-, o-, and m-diethylene phenylene) terephthalamides, polymethylpiperazylene terephthalamides and polydimethyl piperazylene terephthalamides.

The process of the invention may be used also to prepare high melting polyamides of aromatic acids other than terephthalic acid, e.g. of isophthalic acid, 2,6-naphthalenedicarboxylic acid, p,p'-dicarboxydiphenyl, p,p'-dicarboxydiphenylmethane, phenylenediacetic acid, phenylene dipropionic acid, and phenylenedibutyric acid where the diamine moieties of the polyamides may be the same as those of polyterephthalamides mentioned above, such as in polyethylene isophthalamide. In addition the process may be used to make high melting polyamides of alkylene dicarboxylic acids such as adipic acid and cyclic diamines such as p-xylylene diamine and p-bis-aminoethylbenzene.

Of particular interst in connection with the process of the invention is the production of polyhexamethylene terephthalamide from the corresponding salt, hexamethylene diammonium terephthalate. In the preferred procedure of preparing this polymer, a mass of the substantially dry salt is charged to a reaction zone capable of being shut off from the atmosphere. Some free terephthalic acid or hexamethylene diamine, preferably the former, in an amount of 0.0 to 1% by weight of the salt may also be charged to the reaction zone with the salt. The vapor space of the reaction zone is then pressured with nitrogen, e.g. to 150 p.s.i.g. and vented to atmospheric pressure and this procedure is repeated several times both at room temperature and at an elevated temperature which is however below the temperature at which polymerization is initiated, e.g. 150° C., to reduce the presence of oxygen. The reaction zone is then closed to the atmosphere and the mass is heated up in a period within the range of about ¼ to 2 hours, to a temperature of at least 240° C., preferably above 265° C. under autogenous pressure which reaches a maximum in the range of about 500 to 800 p.s.i.g. or higher. The mass is polymerized under autogenous pressure for a period of about 30 to 360 minutes during which the temperature may be raised further to a level for example in the range of 260 to 290° C. The reaction zone is then again opened to the atmosphere and the pressure reduced slowly within a period of about 10 to 60 minutes, to a minimum pressure in the range of the vapor pressure of the reaction mass up to 100 p.s.i.g., preferably 1 atmosphere. The reaction is then completed at the latter pressure and a temperature in the range for example of 260 to 290° C. for an additional period in the range of about 60 to 300 minutes.

As an alternative procedure, the hexamethylene diammonium terephthalate salt is charged to the reactor with excess water, e.g. 25 to 100% based on the weight of salt. The reactor is then sealed and the mass is stirred while it is heated, for example, to a temperature in the range of 140 to 180° C. and a corresponding pressure in the range of 50 to 150 p.s.i.g. Under these conditions, the salt dissolves completely in the water but the polymerization reaction is not initiated. The solution is held at these conditions for a period sufficient to insure complete solution of the salt, after which the reaction zone is opened to the atmosphere and excess water is bled off slowly. The reactor may be vented to atmospheric pressure or, alternatively, an amount of free water, e.g. 7 to 25% based on the weight of the salt may be left in the reactor for the polymerization at autogenous pressure. The polymerization may then be carried out as described above. The venting of water vapor provides for additional flushing of oxygen from the system, and the retention of some free water in the system on heating to polymerization temperatures is capable of yielding polymer of higher inherent viscosity and greater degree of product uniformity.

By means of the process of this invention, polyhexamethylene terephthalamide polymers may be easily and economically obtained which have inherent viscosities above 0.8 or 1.0 and simultaneously plugging values above 0.1 or 0.2. In particular, polymers having an inherent viscosity of at least 1.35 or 1.4 and a plugging value of at least 0.1 may be obtained. These polymers are capable of being formed into useful shaped articles of particularly desirable properties, e.g., by the sulfuric acid wet spinning processes described in application Serial No. 83,981, filed January 23, 1961 by Cipriani.

The following examples further illustrate the invention. All proportions are by weight unless otherwise indicated. In all the examples, stirring of the mass was continued all during the polymerization reaction.

*Example I*

To a reactor filled with a stirrer and capable of being tightly sealed against the atmosphere were added 1200 parts of dry hexamethylene diammonium terephthalate salt. The reactor was flushed well with high purity nitrogen by pressurizing the reactor to 150 p.s.i.g. with the nitrogen, releasing to the atmosphere and repeating this procedure three times. The mass was then heated, after stirring was begun, to 150° C. over a period of 45 minutes, held at this temperature for 30 minutes after which the above described nitrogen pressurizing procedure was repeated five times. The reactor was then closed and the temperature raised to about 250° C. over a period of 55 minutes. After 50 minutes at 250° C., the pressure started to rise indicating the start of the polymerization reaction. The polymerization autogenous pressure was continued at 250° C. for an additional 35 minutes after which the temperature was raised to 280° C. over a 25-minute period and held for 30 additional minutes at this temperature under autogenous pressure during which the pressure reached a maximum of 700 p.s.i.g. The reactor was vented to atmospheric pressure slowly over a 20-minute period and the mass retained at 280° C. for an additional 150 minutes to complete the reaction.

The inherent viscosity of the polyhexamethylene terephthalamide product was 1.35, the plugging value was 0.12 (determined from a solution having a concentration of 2.0 grams of polymer per deciliter of concentrated $H_2SO_4$ solvent using a 4.5 square centimeter filter), and a combined hexamethylene diamine content of 0.44 percent less than the theoretical stoichiometric amount, e.g. that present in the initial salt, determined by titration of an aqueous solution of the total base given off during the reaction.

*Example II*

2000 parts of stoichiometrically balanced hexamethylene diammonium terephthalate salt was dissolved in 3730 parts of distilled water at 90° C. To this solution were added 10 parts of terephthalic acid and the solution was heated and stirred until all the acid dissolved. The solution was then cooled to below 10° C. to separate salt crystals which were filtered off, washed with methanol and dried in a vacuum oven.

The salt was charged to a reactor which was flushed with nitrogen as described in Example I. The reactor was then closed and the temperature of the mass was raised after stirring was begun from 150° C. to 250° C. over a 40-minute period. After 40 minutes at 250° C., the pressure started to rise indicating the start of the polymerization reaction. The mass was held at 250° C. for an additional 85 minutes during which the pressure rose to 525 p.s.i.g. About 20 parts of water were then vented from the reactor decreasing the pressure to 450 p.s.i.g. The temperature was then raised under autogenous pressure to 290° C. over a 25-minute period and held under autogenous pressure at 290° C. for an additional 20 minutes after which the pressure was 575 p.s.i.g. The pressure was then reduced to atmospheric by bleeding off water over a 25-minute period and the mass was held at 290° C. and atmospheric pressure for four hours.

The product had an inherent viscosity of 1.13 and a plugging value of 1.1 determined as in Example I.

*Example III*

A mixture of 1200 parts of hexamethylene diammonium terephthalate salt, 800 parts of distilled water and 6 parts of terephthalic acid were charged to a reactor which was then flushed with nitrogen three times by pressuring to 150 p.s.i.g. and releasing the pressure to atmospheric. The reactor was then closed and the mass was heated to 180° C. After ½ hour at this temperature, 550 parts of water were vented from the reactor to reduce the pressure from 155 p.s.i.g. to 65 p.s.i.g. With the remaining excess water in the reactor, the mass was heated to 255° C. over a one-hour period after which there was a sharp rise in pressure indicating the start of the polymerization reaction. The temperature of the mass was raised to 280° C. over a 20-minute period after which the pressure was 615 p.s.i.g., and held at 280° C. for 25 minutes after which the pressure was 710 p.s.i.g The reactor was then vented to atmospheric pressure over a 30-minute period and held at 280° C. and atmospheric pressure for an additional 180 minutes.

The polyhexamethylene terephthalamide product had an inherent viscosity of 1.11, a plugging value of about 5.2 (determined with a 4.5 square centimeter filter and a solution having a concentration of 5 grams of polymer per deciliter of concentrated sulfuric acid solvent), and a combined hexamethylene diamine content of 1.10% less than the theoretical stoichiometric amount.

*Example IV*

To a reactor were added 400 parts of hexamethylene diammonium terephthalate salt and 200 parts of distilled water. After flushing the vessel with nitrogen it was closed off from the atmosphere and heating and stirring was begun. When the temperature reached 180° C. and the pressure 110 p.s.i.g., the added water was flushed from the system by opening the autoclave to the atmosphere such that the pressure reduced to about 11 p.s.i.g. After substantially all of the added water was flushed from the vessel it was closed and the mass was heated under autogenous pressure. The pressure began to build up rapidly after about one hour of heating indicating the start of the polymerization reaction. The mass was heated to 290° C. and maintained at this temperature. The maximum pressure reached was 329 p.s.i.g., the period that the mass was polymerized under autogenous pressure, i.e. from the point at which the pressure began to rise sharply was about ½ hour, and the mass was at the maximum pressure for about 10 minutes. The pressure was then slowly reduced over a period of about 45 minutes while removing water of reaction during which time the temperature of reaction of about 290° C. was substantially maintained. The mass was then further reacted at this temperature and about atmospheric pressure for an additional 4½ hours. After cooling, a finely divided polymer was obtained which had an inherent viscosity of 1.50 and a combined hexamethylene diamine content of 0.68 mol percent less than the theoretical stoichiometric amount.

*Example V*

The procedure of Example IV was repeated except that the initial charge was 800 parts by weight of hexamethylene diammonium terephthalate salt, 820 parts by weight of technical grade alpha-methyl naphthalene, and 200 parts by weight of distilled water, a maximum pressure of 360 p.s.i.g. and a polymerization temperature of 285° C. was reached in ½ hour from the start of polymerization at autogenous pressure, the mass was held at the latter temperature and pressure for an additional ½ hour following which the pressure was reduced and the water of reaction was removed slowly over a 25-minute period, and the system was maintained at a pressure below 25 p.s.i.g. for an additional 2 hours. After cooling, the product was filtered and the alpha-methyl naphthalene was removed by benzene extraction in a Soxhlet extractor. The resulting polymer had an inherent viscosity of 1.10, a plugging value of 0.53 (determined from a solution having a concentration of 2 grams of polymer per deciliter of concentrated sulfuric acid solvent using a 10 square centimeter filter), and a combined hexamethylene diamine content 0.84% less than the theoretical maximum.

*Example VI*

The procedure of Example V was repeated except that instead of alpha-methyl naphthalene, about 800 parts by weight of a deodorized kerosene fraction boiling in the range of 204 to 260° C. was used as the inert liquid medium, the maximum pressure reached during the autogenous pressure polymerization cycle was 505 p.s.i.g., and the mass was reacted for 2¼ hours after the pressure reduction cycle at a pressure below 25 p.s.i.g. The resulting product had an inherent viscosity of 1.39, a plugging value of 0.15 (determined from a solution having a concentration of 0.4 gram of polymer per deciliter of concentrated sulfuric acid solvent using a 24 square centimeter filter), and contained 1.07% less than the theoretical maximum stoichiometric amount of combined hexamethylene diamine.

*Example VII*

The procedure of Example V was repeated except that 1200 parts of hexamethylene diammonium terephthalate, 1230 parts of alpha-methyl naphthalene and 300 parts of water were used and the maximum pressure reached during the autogenous pressure cycle was 585 p.s.i.g. The product had an inherent viscosity of 1.28.

*Example VIII*

The procedure of Example V was repeated except that the initial charge was 1200 parts by weight of hexamethylene diammonium terephthalate salt, 1230 parts by weight of a coal tar distillate fraction containing a major proportion of alpha-methyl naphthalene and 200 parts of distilled water, and the maximum pressure reached during the polymerization at autogenous pressure was 630 p.s.i.g. The product had an inherent viscosity of 1.34, a plugging value of 0.93 (determined as in Example V), and a combined hexamethylene diamine content 0.74% less than the theoretical stoichiometric maximum.

*Example IX*

The procedure of Example IV was repeated except that the initial charge was 1140 parts by weight of hexamethylene diammonium terephthalate salt, and 860 parts by weight of distilled water. The amount of water removed during the flushing cycle was 670 parts by weight, leaving 190 parts of water in the reactor at the start of the polymerization at autogenous pressure. The maximum pressure reached during the polymerization at autogenous pressure was 770 p.s.i.g., the period of polymerization at autogenous pressure was 35 minutes, the period of pressure reduction was 20 minutes, and the period at atmospheric pressure was 2½ hours. A product was obtained having an inherent viscosity of 1.73, and a plugging value of 0.15 (determined from a solution having a concentration of 2 grams of polymer per deciliter of concentrated sulfuric acid solvent, using a 24 square centimeter filter). The combined hexamethylene diamine content of this product was 1.12% less than the theoretical stoichiometric maximum.

The values of inherent viscosity given above were determined from solutions of polymer in concentrated sulfuric acid of 98% $H_2SO_4$ concentration at 25° C. containing 0.4 of polymer per deciliter of acid.

The plugging values given above were determined by filtering a solution of polymer having a concentration in 98% $H_2SO_4$ of 0.4 to 2.0 grams of polymer per deciliter of acid at about 25° C. through a funnel-shaped, fine-sintered glass filter having pores of about 4 to 5.5 microns in diameter and filter area of 4.5 to 24 square centimeters. A vacuum was maintained at the outlet side of the filter so that the pressure drop across the filter was about 1 atmosphere, and the filter was conditioned by sending through pure concentrated acid (98% $H_2SO_4$) at a constant rate prior to filtration of the polymer solution. The volume of polymer solution filtrate (V) and the total time period of filtration (t) was recorded every minute or every few minutes. After a short time period, e.g. about 10 or 15 minutes, V was plotted against t and a curve extrapolated to zero time (t=0). The extrapolated value of V thus obtained was then subtracted from each value of V obtained. Filtration was continued with values of V and t being recorded every few minutes. Values of t/V as ordinate were then plotted against corresponding values of t as abscissa and the best straight line was drawn through the points. If the points substantially defined a continuous straight line, the reciprocal of the slope of this straight line was multiplied by the polymer concentration of the solution in grams per volume unit and divided by the area of the filter in square centimeters to obtain the plugging value. If the points did not yield a continuous straight line, the alternative method described above for obtaining the plugging value was used. The plugging values determined by both methods are substantially equivalent.

With the type of filter used, the constant rate at which pure concentrated sulfuric acid having a concentration of 98% $H_2SO_4$ and containing no polymer is drawn through the filter at 25° C. and a pressure drop of one atmosphere is 2 to 2.5 milliliters per square centimeter per minute. The constant rate occurs following an initial period during which the rate is variable due to the fact that the pores are being wetted.

It is to be understood that the foregoing detailed description is given merely by way of illustration and that many variations may be made therein without departing from the spirit of my invention.

Having described my invention, what I desire to secure by Letters Patent is:

1. A process comprising subjecting a polyamide precursor salt of a diamine and a dicarboxylic acid to a polymerization temperature under autogenous pressure developed by retaining effluent vapors in a closed reaction space during the polymerization reaction, while causing movement of the particles of said precursor with respect to one another, said autogenous pressure reaching a maximum of at least 300 p.s.i.g., the heat expended in maintaining said temperature being insufficient to completely liquefy the particles of the polymerizing mass.

2. The process of claim 1 wherein said polymerization temperature is within the range extending from 20° C. below the melting point of said precursor up to the melting point of the polymerizing mass.

3. The process of claim 1 wherein a substantially dry salt is initially employed as the polyamide precursor.

4. The process of claim 1 wherein said autogenous pressure is reduced to a pressure in the range of the vapor pressure of the reaction mass to 100 p.s.i.g. and the reaction is continued at the latter pressure for a period of at least 60 minutes while maintaining said polymerization temperature.

5. The process of claim 1 wherein the polymerization is carried out such that the difference between the content in the final polymer of the more volatile monomer initially making up said salt, and the theoretical stoichiometric amount capable of reacting with the less volatile monomer originally present in said salt is in the range of +1.5 to −1.5 mol percent based on said stoichiometric amount.

6. The process of claim 5 wherein a portion of said less volatile monomer is added to the system in free form before the reaction proceeds.

7. A process comprising heating a mixture of a high molecular weight polyamide precursor salt of a diamine and a dicarboxylic acid and water under autogenous pressure developed by retaining water vapor in a closed reaction space to a temperature above the atmospheric boiling point of the resulting composition but below that at which substantial polymerization occurs, reducing the pressure while flushing water vapor to the atmosphere, and heating the mass to polymerization temperature, the heat expended in maintaining said temperature being insufficient to completely liquefy the particles of the polymerizing mass.

8. A process comprising heating a salt of a diamine and a dicarboxylic acid capable of being formed into high molecular weight polyamides to a polymerization temperature in the range extending from about 20° C. below the melting point of said salt, up to the melting point of the polymerizing mass, under autogenous pressure developed by retaining effluent vapors in a closed reaction space during the polymerization reaction while causing movement of the particles of said salt with respect to one another, for a period of at least 30 minutes, said autogenous pressure reaching a maximum of at least 300 p.s.i.g., and reducing said autogenous pressure to a pressure in the range of atmospheric to 100 p.s.i.g. while maintaining said polymerization temperature for a period of at least 60 minutes after said pressure reduction under autogenous pressure developed by retaining effluent vapors in said closed reaction space during the polymerization reaction while causing movement of the particles of said precursor salt with respect to one another, said polymerization autogenous pressure reaching a maximum of at least 300 p.s.i.g., the heat expended in maintaining said polymerization temperature being insufficient to completely liquefy the particles of the polymerizing mass.

9. The process of claim 1 wherein said autogenous pressure reaches a maximum in the range of 300 to 1000 p.s.i.g.

10. A process of producing polyhexamethylene terephthalamide from finely divided hexamethylene diammonium terephthalate salt comprising subjecting said salt to a polymerization temperature not lower than about 240° C. under autogenous pressure developed by retaining effluent vapors in a closed reaction space during the polymerization reaction while causing movement of the particles of said salt with respect to one another, in the substantial absence of oxygen for a period of at least 15 minutes, said autogenous pressure reaching a maximum of at least 300 p.s.i.g., the heat expended in maintaining said temperature being insufficient to completely liquefy the particles of the polymerizing mass.

11. The process of claim 10 wherein said autogenous pressure is reduced to a value in the range of from the vapor pressure of the reaction mass to 100 p.s.i.g. and said polymerization temperature is maintained for at least 60 minutes after said pressure reduction.

12. The process of claim 10 wherein said autogenous pressure reaches a maximum in the range of 300 to 1000 p.s.i.g. and said polymerization temperature reaches a maximum in the range of 260 to 290° C.

13. The process of claim 8 wherein the polymerization is carried out such that the content of combined hexamethylene diamine in the final polymer is within the range of 98.5 to 101.5 mol percent of the hexamethylene diamine present in the initial salt.

14. A process comprising heating hexamethylene diammonium terephthalate salt mass under autogenous pressure developed by retaining effluent vapors in a closed reaction space during the polymerization reaction while causing movement of the particles of said salt with respect to one another, at a polymerization temperature of at least 240° C. for a period of at least 30 minutes, the heat expended in maintaining said temperature being insufficient to completely melt the mass, said autogenous pressure reaching a maximum of at least 300 p.s.i.g., reducing said autogenous pressure to a pressure in the range of from the vapor pressure of the mass to 100 p.s.i.g. while maintaining said polymerization temperature over a period of at least 10 minutes during said pressure reduction, and maintaining the polymerization temperature at said latter pressure for a period of at least 60 minutes.

15. The process of claim 14 wherein the maximum pressure reached during said polymerization of autogenous pressure is within the range of 300 to 1000 p.s.i.g. and the maximum reaction temperature is within the range of 260 to 290° C.

16. The process of claim 1 wherein said reaction is carried out in the presence of an inert organic medium liquid under the conditions of reaction.

17. The process of claim 14 wherein said process is carried out in the presence of an inert organic medium liquid under the conditions of reaction.

18. A process comprising subjecting particles of a substantially dry polymerizable salt of a diamine and terephthalic acid at a pressure of at least atmospheric pressure, to a polymerization temperature under autogenous pressure developed by retaining all the effluent vapors given off during the polymerization reaction in the reaction space while causing movement of the reacting particles with respect to one another, said autogenous pressure reaching a maximum of at least 300 p.s.i.g., the heat expended in maintaining said temperature being insufficient to completely liquefy said particles.

References Cited by the Examiner

UNITED STATES PATENTS

| | | | |
|---|---|---|---|
| 2,172,374 | 9/1939 | Flory | 260—78 |
| 2,190,770 | 2/1940 | Carothers | 260—78 |
| 2,987,507 | 6/1961 | Levine | 260—78 |
| 3,031,433 | 4/1962 | Monroe | 260—78 |

FOREIGN PATENTS

| | | |
|---|---|---|
| 614,625 | 12/1948 | Great Britain. |
| 794,365 | 4/1958 | Great Britain. |
| 801,733 | 9/1958 | Great Britain. |

WILLIAM H. SHORT, *Primary Examiner.*

JOSEPH R. LIBERMAN, *Examiner.*